United States Patent Office 2,791,530
Patented May 7, 1957

2,791,530

STABILIZED FUMAGILLIN COMPOSITIONS

Albert A. Dallavis and Clarence J. Endicott, Waukegan, Ill., assignors to Abbott Laboratories, North Chicago, Ill., a corporation of Illinois No Drawing. Application August 31, 1953,
Serial No. 377,682

4 Claims. (Cl. 167—65)

This invention relates to stabilized fumagillin compositions and to dosage units containing such compositions. The invention further relates to a method for stabilizing fumagillin.

Fumagillin is an antibiotic which can be isolated from the organism *Aspergillus fumigatus* by techniques of extraction and concentration. Fumagillin is highly effective against *Endamoeba Histolitica* in humans at a dosage of about 30 to 60 milligrams per day for about 10 to 14 days. Anderson et al., have reported to this effect in the American Journal of Tropical Medicine, vol. 1, pg. 552 (July 1952). Killough et al., reported in Science, vol. 115, pg. 71 (Jan. 18, 1952). The antibiotic is also effective against certain other parasites such as Nosema apis in bees.

One of the principal difficulties in the use of fumagillin is its notorious instability in the presence of heat and/or light. As a result of this instability it is common for samples of fumagillin to lose from ¼ to ¾ of their potency in a relatively short period of days upon storage at room temperature. The instability of the antibiotic to light may be overcome to a certain extent by storing in amber bottles. This does not solve the problem, however, since samples stored in amber bottles will nevertheless lose a large proportion of their potency upon storage at room temperature.

A large number and variety of antioxidants and preservatives have been tried in an attempt to stabilize fumagillin. For example, the antioxidants which are commonly employed in the stabilization of vitamin A (ethyl hydrocaffeate and nordihydroguaiaretic acid) were tried because there is an indication of some similarity between the chemical structure of fumagillin and vitamin A. None of these antioxidants had any particularly good effect. Other antioxidants commonly employed in the pharmaceutical and chemical arts such as hydroquinone and sodium benzoate were also found to be ineffective in preventing loss of activity of fumagillin upon storage. Reducing agents such as sodium citrate and sodium metabisulfate were also ineffective.

It is a principal object of the invention to provide a fumagillin composition which will retain its original potency over a normal period of storage on the shelf under normal conditions.

Another object of the invention is to provide a new and improved granulation process for the preparation of granulations, and tablets and capsules therefrom having improved stability.

Another object of the invention is to incorporate fumagillin polyethylene glycol combinations into dosage forms in such a manner that the fumagillin will remain stable under normal conditions of storage.

A further object of the invention is to provide a method for stabilizing fumagillin against loss of potency by combining it with a stabilizing quantity of a solid, water-soluble polyethylene glycol.

In the accomplishment of the foregoing objects and in accordance with the practice of the invention there is now provided a stable fumagillin composition which is therapeutically active and which comprises fumagillin particles in intimate admixture with an amount of a solid, water-soluble polyethylene glycol thereon sufficient to inhibit loss of potency of the fumagillin. The amount of solid polyethylene glycol should be adjusted so that all of the particles of fumagillin in the composition are substantially coated with the polyethylene glycol. We may use as little as about 10% of the solid polyethylene glycol based on the weight of the fumagillin and desirably we may use at least about equal parts by weight of glycol based on the fumagillin. Higher percentages of solid polyethylene glycol may be used if desired since the materials are proven to be non-toxic when taken orally. There is no reason that large proportions of solid polyethylene glycol cannot be employed in the practice of this invention.

Further in accordance with the practice of the invention there is now provided dosage unit forms containing the stabilized therapeutically active fumagillin combination with a coating of solid polyethylene glycol thereon, in an amount providing not less than an active amount of fumagillin per dosage unit. The dosage unit may take the form of a tablet, capsule, granule, powder mixture or granulation. Regardless of the form, however, it is necessary in the practice of the invention that the fumagillin particles be substantially coated with an inert solid polyethylene glycol in order to render the fumagillin stable to storage conditions. The amount of active fumagillin in the dosage unit may vary within limits which would be suggested to one skilled in this art. Five milligrams is a lower dose and this represents an amount which can be contained conveniently, along with the stabilizing polyethylene glycol, solids and diluents, in a tablet or capsule. Up to 40 or 60 milligrams of active fumagillin may be used in each dosage unit if desired since this represents the presently indicated maximum daily dose. Larger amounts may be used in a dosage unit without difficulty if such amounts are indicated for human or veterinary use.

The solid, water-soluble polyethylene glycols to which this invention refers are represented by those sold under the trade name Carbowax (Carbide and Carbon Chemicals Co.). The polyethylene glycols are polymers of the ethylene glycols which range in molecular weight from approximately 200 up to about 7500. The polyethylene glycols having average molecular weights ranging from about 200 to about 700 are liquids at room temperature. Those having molecular weights above 1000 are wax-like solids which increase in melting point as the molecular weight increases, for example, a polyethylene glycol having a molecular weight of about 6000 has a freezing range of between 60° C. and 63° C. Actually the commercial solid products are a mixture of non-volatile, solid polyethylene glycols which are soluble in both water and organic liquids and which have average molecular weights of about 1000 to 7500. These substances resemble natural waxes in appearance and texture but are soluble in a much wider range of solvents, and in water. It will be apparent from the foregoing description of the solid polyethylene glycols that a wide range of such materials are readily available and the texture, melting point and physical appearance may be altered widely by mixing the various commercially available polyethylene glycols in any indicated amount. For example, it is possible to lower the melting point of polyethylene gycol 6000 by adding to it a small amount of a liquid polyethylene glycol, such as one having a molecular weight of around 200 or 300. As a matter of fact a commercially available polyethylene glycol (Carbowax 1500, Carbide and Carbon Chemicals Co.) having a molecular weight of between 500 and 600 is nevertheless a bland, odorless, water-soluble, white solid with the consistency of low melting petrolatum. This preparation is a blend of equal parts of polyethylene glycol 300 and polyethylene glycol 1540. Whenever a number is used with the glycol it represents the average molecular weight thereof.

The term "solid" as used in defining the polyethylene glycol suitable for use in this invention, is intended to infer that the material must be non-liquid at room temperature. Consequently it will be advantageous in the practice of this invention to use a polyethylene glycol solid having a melting point above room temperature.

The polyethylene glycol coating is applied to the fumagillin crystal or particle by simply heating the polyethylene glycol until it becomes liquid. Thereafter, the liquid polyethylene glycol is poured over the fumagillin crystals or particles and mixed sufficiently to cause a substantially even coating of the solid polyethylene glycol to be deposited around the fumagillin particles.

Any of the commonly employed diluents, lubricants and fillers or binders normally used in the preparation of tablets and capsules may be employed along with the fumagillin-solid polyethylene glycol combination of this invention. It has been previously shown in co-pending application Serial No. 319,597, filed November 8, 1952, and now abandoned, that a finely divided solid which is inert to fumagillin has a substantial stabilizing effect upon the fumagillin particles. In the co-pending application it is pointed out that such inert solids as talc, diatomaceous earth, pumice, sodium metaphosphate insoluble, sucrose, cellulose, raffinose, melezitose and trehalose are suitable.

It is contemplated in this invention that any of the aforementioned solids may be incorporated with fumagillin and the solid polyethylene glycol in the formation of a stable fumagillin composition which may then be tableted or capsuled. In fact we have found that it is advantageous to add a material such as sucrose or talc to a solid polyethylene glycol having a melting point in the lower ranges in order to make the solid polyethylene glycol somewhat harder and more brittle. The addition of a solid such as sucrose or talc will also tend to prevent the softening of the solid polyethylene glycol when the temperature is raised to a point near that of the melting point of the polyethylene glycol. It should be clearly understood, however, that the stabilizing effect of the solid polyethylene glycol does not necessarily depend upon the presence of the inert solid.

The term "stability" is used herein in its ordinary sense in the pharmaceutical art and it is intended to include small losses of potency upon storage on the shelf at room temperature for a long period of time. That is to say, losses which do not exceed around 8% to 10% in 6 months time are considered to be satisfactory for a product of this nature. It is difficult if not impossible to find any sample of fumagillin which will not lose more than 8% of its potency when stored at 40° C. for 6 months in the absence of a stabilizing factor. On the other hand with the practice of this invention it is possible to maintain the loss of potency of fumagillin far below the arbitrarily set standard.

The following examples are presented in order to describe the invention more clearly and to point out some of the details thereof. It should be remembered, however, that the invention is not intended to be limited by these examples.

*Example I*

Tablets were prepared so that each one would contain approximately 10 milligrams of fumagillin. The formula for the preparation of 500 such tablets is as follows:

| | Grams |
|---|---|
| Fumagillin | 5.0 |
| Carbowax–6000 | 81 |
| Stearic acid | 1.3 |
| Talc | 1.7 |

Melt the Carbowax on a water bath and incorporate the fumagillin therein with stirring. Allow the mixture to cool until the Carbowax becomes solid. Then pass the mixture through a 16 mesh screen. Add the lubricants through a 40 mesh screen and blend the mixture well. Compress into tablets. The initial fumagillin assay of these tablets is 98% and after one year at 5° C. the tablets still showed 90% of the initial activity.

*Example II*

500 tablets were made up according to the following formula:

| | Grams |
|---|---|
| Fumagillin | 5.0 |
| Carbowax–6000 | 41 |
| Carbowax–4000 | 40 |
| Tenox | .10 |
| Talc | 1.70 |
| Stearic acid | 1.30 |

The ingredients are prepared in the same manner shown in Example I and compressed into tablets. The initial fumagillin assay of these tablets was 96% and after one year at 5° C. the tablets showed a fumagillin assay of 88.5%.

*Example III*

Three hundred tablets were prepared in the following manner:

| | Grams |
|---|---|
| Fumagillin (in sugar) | 4.5 |
| Granular sucrose | 60.0 |
| Talc | 3.45 |
| Stearic acid | 1.38 |

The sucrose was dried, mixed with fumagillin and passed through a 20 mesh screen. Lubricants were added through a 40 mesh screen and blended well. Tablets were compressed using a 5/16 inch convex punch. After six months storage at 40° C. the tablets lost about one third of the fumagillin activity.

*Example IV*

In an experiment carried out under conditions similar to Example III, and using the same lot of fumagillin, the following formula was used:

| | Grams |
|---|---|
| Fumagillin (in sugar) | 4.5 |
| Sucrose | 60.0 |
| Talc | 3.45 |
| Stearic acid | 1.38 |
| Carbowax–6000 | 36.91 |

The sucrose was dried and mixed with fumagillin and passed through a 20 mesh screen. The Carbowax was melted and added to the powder with stirring until the mass solidifies. The mass was ground to a 20 mesh granulation and the lubricants were added. Tablets were compressed with a 3/8 inch convex punch. After six months storage at 40° C. these tablets lost not more than about 5% of the fumagillin activity.

*Example V*

Five hundred tablets were prepared by the method of Example III using the following formula:

| | Grams |
|---|---|
| Fumagillin | 5.62 |
| Sucrose | 100.00 |
| Talc | 5.75 |
| Stearic acid | 2.30 |

These tablets lost about 17% of the initial fumagillin potency when stored at 40° C. for 3 months.

Example VI

Five hundred tablets were prepared by the method of Example IV using the same lot of fumagillin as in Example V:

| | Grams |
|---|---|
| Fumagillin | 5.62 |
| Sucrose | 100.00 |
| Talc | 5.75 |
| Stearic acid | 2.30 |
| Carbowax–6000 | 61.60 |

These tablets lost only about 2% of the initial fumagillin potency upon storage at 40° C. for 3 months.

Example VII

A granulation was made up according to the following formula:

| | Grams |
|---|---|
| Fumagillin | 69.0 |
| Sucrose | 659.0 |
| Carbowax–6000 | 659.0 |
| Talc | 43.0 |
| Stearic acid | 10.0 |

The fumagillin and sucrose is blended well and passed through a 30 mesh screen. The Carbowax is melted and stirred into the previously prepared mixture. After cooling to a solid the material is passed through a 16 mesh screen and the lubricants are added.

A portion of this granulation was placed on stability and was found to have a stability exceeding that of the fumagillin by itself.

Another portion of the foregoing granulation was encapsulated in #3 orange capsules so that each capsule contained 240 milligrams of material and 10 milligrams of fumagillin activity. The initial assay of the granulated material was 104% and after 5 months at 40° C. the material still retained 92.5% of its initial fumagillin activity.

Example VIII

A portion of the granulation from Example VII was tableted and coated in the usual fashion. The initial assay was 104% and after 6 months at 40° C. the tablets still assayed 100% of the fumagillin activity.

Example IX 3000 tablets were made up according to the following formula:

| | Grams |
|---|---|
| Fumagillin | 33.9 |
| Sucrose | 656.1 |
| Talc | 34.5 |
| Stearic acid | 13.8 |
| Carbowax–6000 | 369.1 |

The fumagillin and sucrose were mixed and the melted Carbowax 6000 was added to the mixture. The mixture was allowed to harden and was then passed through a 16 mesh screen. The lubricants were added and the mixture blended well. After tableting the tablets were coated with a 25% Carbowax–6000 in alcohol solution. The tablets were then subcoated with gelatin and acacia and were coated with sugar syrup and polished. The initial assay of these tablets was 102% and after 6 months at 40° C. there had been only a 2% drop in activity.

Example X 500 tablets were made up according to the following formula:

| | Grams |
|---|---|
| Fumagillin | 10.0 |
| Sucrose | 65.0 |
| Carbowax–6000 | 39.86 |
| Talc | 3.72 |
| Stearic acid | 1.42 |

The sucrose and fumagillin were passed through a 20 mesh screen into a mixing bowl. Melted Carbowax was added to the mixture with stirring. After cooling the mass was granulated by passing through a 40 mesh screen. The lubricants were added through a 40 mesh screen and the well mixed granulation was compressed into tablets. Alternate coats of 20% Carbowax in alcohol and zein-resin coating composition were applied with talc dusting. Then a subcoat of Gel-Acacia and subcoating powder was applied and a top coating of syrup was given. The tablets are stable.

Example XI 500 tablets were made up according to the following formula:

| | Grams |
|---|---|
| Fumagillin | 10.0 |
| Sucrose | 65.0 |
| Carbowax–2000 | 39.86 |
| Talc | 3.72 |
| Stearic acid | 1.42 |

The procedure outlined in Example X was repeated with the formation of a stable tablet.

Example XII 500 tablets were made up according to the following formula:

| | Grams |
|---|---|
| Fumagillin | 10.0 |
| Talc | 65.0 |
| Carbowax–6000 | 39.86 |
| Sucrose | 3.72 |
| Stearic acid | 1.42 |

The procedure outlined in Example X was followed with the successful preparation of a stable fumagillin tablet.

Example XIII

Nonpareil seeds of a small size are coated with the slurry or solution of fumagillin and Carbowax–6000. The coated seeds were then top coated with a small amount of a conventional resin coating composition and were finished off with a thin coating of sugar syrup. The result is a very small seed which has a pleasing taste and appearance and is highly suitable for a pediatric dosage form. The amount of fumagillin required in a pediatric dosage form is quite small and can readily be applied to nonpareil seeds in this fashion without building the seed up to a large size. The Carbowax previously described in this example may be either in a molten state or it may be in solution in solvent.

As will be noted from the preceding examples the essential ingredients of this new stable fumagillin composition are fumagillin and a solid, water-soluble polyethylene glycol. It is sometimes desirable to add fillers, diluents and lubricants in order to prepare a composition which will be suitable for tableting. The presence of such fillers, diluents and lubricants and also of antioxidants does not have any significant effect upon the stabilizing properties of the polyethylene glycol for the fumagillin. Hence, the term "comprising" is employed herein to denote that certain elements are essential to the composition while others may or may not be present without seriously affecting the properties of the finished product.

Others may practice this invention in any of the numerous ways which will be suggested to one skilled in the art. Variations on the invention are intended to be included herewith provided that they fall within the scope of the appended claims.

We claim:

1. A stabilized, therapeutically active fumagillin composition comprising particles of fumagillin coated with at least about equal parts by weight of a solid, water-soluble polyethylene glycol having a molecular weight of at least about 1000.

2. A fumagillin tablet characterized by stability of the fumagillin which comprises the compressed combination of at least about 5 mg. of fumagillin in intimate admixture with at least about equal parts by weight of a solid, water-soluble polyethylene glycol having a molecular weight of at least about 1,000.

3. A fumagillin tablet characterized by stability of the fumagillin which comprises the compressed combination of at least about 5 mg. of fumagillin in intimate admixture with an inert, finely-divided solid and at least about equal parts by weight of a solid, water-soluble polyethylene glycol having a molecular weight of at least about 1,000.

4. A stable, therapeutically active fumagillin composition comprising a granulation of fumagillin in intimate admixture with at least about equal parts by weight of a solid, water-soluble polyethylene glycol having a molecular weight of at least about 1,000 sufficient to coat the particles of fumagillin and to inhibit loss of activity of said fumagillin.

References Cited in the file of this patent

UNITED STATES PATENTS

| Number | Name | Date |
|---|---|---|
| 22,433 | Jenkins | Dec. 28, 1858 |
| 1,246,392 | Carrasco | Nov. 13, 1917 |
| 1,809,016 | Brogden | June 9, 1931 |
| 1,827,219 | Brogden | Oct. 13, 1931 |
| 2,149,005 | Bockmuhl | Feb. 28, 1939 |
| 2,487,336 | Hinds | Nov. 8, 1949 |
| 2,498,374 | Martin | Feb. 21, 1950 |
| 2,556,278 | Irvine | June 12, 1951 |
| 2,584,166 | Stevenson | Feb. 5, 1952 |
| 2,640,040 | Lehman | May 26, 1953 |
| 2,652,356 | Hanson et al. | Sept. 15, 1953 |
| 2,665,992 | Naps | Jan. 12, 1954 |

OTHER REFERENCES

Asheshov: Identity of Fumagillin and Phagopedin Sigma, Antibiotics and Chemotherapy, July 1952, pp. 361–362.